United States Patent [19]
Dicke et al.

[11] Patent Number: 4,614,789
[45] Date of Patent: Sep. 30, 1986

[54] THERMOTROPIC AROMATIC POLYESTERS WITH HIGH RIGIDITY, A PROCESS FOR THE PRODUCTION THEREOF AND THE USE THEREOF FOR THE PRODUCTION OF MOULDINGS, FILAMENTS, FIBRES AND FILMS

[75] Inventors: Hans-Rudolf Dicke; Hermann Kauth, both of Krefeld, Fed. Rep. of Germany

[73] Assignee: Bayer Aktiengesellschaft, Leverkusen, Fed. Rep. of Germany

[21] Appl. No.: 755,847

[22] Filed: Jul. 17, 1985

[30] Foreign Application Priority Data

Jul. 28, 1984 [DE] Fed. Rep. of Germany ....... 3427886

[51] Int. Cl.$^4$ ............................................. C08G 63/60
[52] U.S. Cl. .................... 528/128; 528/125; 528/126; 528/193; 528/194
[58] Field of Search ............... 528/125, 126, 128, 193, 528/194

[56] References Cited

U.S. PATENT DOCUMENTS

| 4,269,965 | 5/1981 | Irwin | 528/128 |
| 4,316,004 | 2/1982 | Imai et al. | 528/126 |
| 4,335,232 | 6/1982 | Irwin | 528/128 |
| 4,381,389 | 4/1983 | Irwin | 528/128 |
| 4,426,511 | 1/1984 | Asada et al. | 528/128 |
| 4,429,100 | 1/1984 | Charbonneau et al. | 528/128 |
| 4,436,894 | 3/1984 | Urasaki et al. | 528/128 |
| 4,473,682 | 9/1984 | Calundann et al. | 528/128 |
| 4,522,974 | 6/1985 | Calundann et al. | 528/125 |

FOREIGN PATENT DOCUMENTS 2058102 4/1982 United Kingdom .

OTHER PUBLICATIONS

Chem. Abstr. 68, p. 2953, No. 30210q (1968).
Chem. Abstr. 78, p. 3, No. 136711a (1973).
Chem. Abstr. 102, p. 72, No. 150777x (1985).

Primary Examiner—Lester L. Lee

[57] ABSTRACT

Thermotropic aromatic polyesters with high rigidity and favorable melt viscosity contain condensed radicals of (a) p-hydroxybenzoic acid, (b) hydroquinone and/or 4,4'-dihydroxydiphenyl, (c) isophthalic acid and optionally terephthalic acid and (d) benzophenone dicarboxylic acid in defined weight ratios.

4 Claims, No Drawings

THERMOTROPIC AROMATIC POLYESTERS WITH HIGH RIGIDITY, A PROCESS FOR THE PRODUCTION THEREOF AND THE USE THEREOF FOR THE PRODUCTION OF MOULDINGS, FILAMENTS, FIBRES AND FILMS

This invention relates to high molecular weight thermotropic completely aromatic polyesters with high rigidity and favourable melt viscosity, a process for the production thereof and the use thereof for the production of mouldings, filaments, fibres and films.

The term "thermotropic" is applied to those substances which form liquid crystalline melts. Thermotropic polycondensates are well known, c.f.

F. E. McFarlane et al., Liquid Crystal Polymers II, Contemporary Topics in Polymer Science, Vol. 2, Plenum Publishing Corporation 1977;

W. J. Jackson and H. F. Kuhfuss, J. Polymer Science, Polymer Chem. Ed. 14, 2042 (1976);

W. C. Wooten et al. in A. Ciferri "Ultra-high Modulus Polymers", Applied Science Publ., London 1979, p. 362 et seq;

A. Blumstein et al., "Liquid Crystalline Order in Polymers", Academic Press 1978;

A. Ciferri, W. R. Krigbaum, R. B. Meyer "Polymer Liquid Crystals", Academic Press, New Work 1982;

EP-A Nos. 1185, 1340, 8855, 11 640, 15 856, 17 310, 18 145, 18 709, 22 344, 44 205, 49 615, 51 934, 67 618, 71 447, 72 155, 76 133;

U.S. Pat. Nos. 3,804,805, 3,991,013, 3,991,014, 4,066,620, 4,067,852, 4,075,262, 4,083,829, 4,130,545, 4,140,846, 4,153,779, 4,161,470, 4,169,933, 4,181,792, 4,188,476, 4,201,856, 4,224,433, 4,230,817, 4,238,598, 4,256,624, 4,267,304, 4,284,757, 4,285,852, 4,311,824, 4,337,191, 4,347,349;

WO Nos. 79/797, 79/1034, 79/1040.

The liquid crystalline state of polymer melts may be examined by means of a polarising microscope: for the examination, the eye piece is equipped with an attachment containing a photodiode positioned at the focal point of the ocular lens. The measuring value on the microscope, when switched on, with Nicol's prisms positioned in a parallel manner, is set by means of a subsequently switched on measuring amplifier with a regulating device, in the absence of a material sample, to 100 scale divisions. A value of 0.01 scale divisions is obtained with crossed Nicol's prisms.

The layer thickness of the examined polycondensation melts is 100 μm.

The examination of the polymers is carried out after melting the samples at a temperature of from 280° to 400° C. If the melts observed between the crossed Nicol's prism brighten in this whole region or in a part thereof, the polycondensation product is classified as thermotropic liquid crystalline.

The liquid crystalline polycondensation products have a measuring value above 1 scale division, mostly values of from 3 to 90 scale division. On the other hand, in the case of amorphous melts, for example aromatic polycarbonates, values of less than 0.1 scale divisions are found.

The above-described method is particularly suitable for a rapid determination in the laboratory and gives unequivocal results in almost all cases. In case of doubt, it can, on the other hand, be useful to prove the presence of liquid crystalline components by means of wide angle X-ray scattering in the melt, as described, for example, in G. W. Gray and P. A. Windsor, "Plastic Crystals, Physico-Chemical Properties and Methods of Investigation", particularly Chapter 3, John Wiley & Sons, New York, Sydney, Toronto 1974.

DE-OS No. 20 25 971 relates to high molecular weight completely aromatic polyesters based on p-hydroxybenzoic acid, aromatic dicarboxylic acids (such as terephthalic or isophthalic acid) and diphenols (such as hydroquinone or 4,4'-dihydroxydiphenyl). These polyesters are thermotropic due to the components used. They can be processed, for example, to form fibres. Of the 13 polyesters in the examples, only one melts below 300° C. These polyesters are thus difficult to process.

Thermotropic liquid crystalline polyesters with a processing temperature of below 380° C. can be obtained if 2,6-disubstituted naphthalene derivatives are used in addition to the structural units defined in DE-OS No. 2025971 for forming the products.

Polyesters with 2,6-dihydroxynaphthalene as the characteristic structural units are known, for example, from the published European Patent Application Nos. 1340 and 18145. The use of 2,6-naphthalene dicarboxylic acid for forming thermotropic aromatic polyesters is described, for example, in the published European Patent Applications Nos. 1185, 18973 and 63881, 6-Hydroxy-2-naphthalene carboxylic acid as the essential monomer unit is likewise already described in a series of publications, for example in the published European Patent Applications Nos. 22344, 44205, 49615, 49617, 67618 and 71447.

The polyesters described in the publications listed have excellent mechanical properties, such as high modulus of elasticity and high strength. However, relatively large quantities of 2,6-disubstituted naphthalene compounds are necessary for achieving these properties, normally more than 20 mol %, based on the monomeric substances used. Owing to the complicated production process and the consequent high production costs of the 2,6-disubstituted naphthalene derivatives, this is economically unsatisfactory.

Some recently published Patent Applications claim the production of thermotropic polyesters using relatively small quantities of 2,6-disubstituted naphthalene derivatives, for example the European Patent Applications Nos. 76133, 92617 and 102160.

It was an object of the present invention to provide thermotropic completely aromatic polyesters, which in comparison to the polyesters of DE-OS No. 20 25 971 can be processed more easily and nevertheless have excellent mechanical properties.

Preferred new thermotropic completely aromatic polyesters should be thermoplastically processible at a temperature of below 370° C., preferably below 350° C., particularly below 330° C.

A further object of the invention was to produce thermotropic completely aromatic polyesters, which, in contrast to the products described in the afore-mentioned European Patent Application, contain no 2,6-disubstituted naphthalene compounds, but which can still be processed to produce mouldings with excellent mechanical strength.

Preferred new thermotropic completely aromatic polyesters should have a flexural modulus of at least 6000, preferably at least 7000, particularly at least 8000 MPa. Moreove, these preferred polyesters should have a flexural strength of at least 100, preferably at least 120, particularly at least 140 MPa.

It has surprisingly been found that completely aromatic polyesters, which contain condensed radicals of p-hydroxybenzoic acid, hydroquinone and/or 4,4'-dihydroxydiphenyl as well as, on the one hand, isophthalic acid and optionally terephthalic acid and, on the other hand, 3,4'- and/or 4,4'-benzophenonedicarboxylic acid, have the desired advantageous properties.

The invention provides thermotropic completely aromatic polyesters based on (a) (optionally substituted) p-hydroxybenzoic acid,
(b) hydroquinone and/or 4,4'-dihdroxydiphenyl,
(c) isophthalic acid and optionally terephthalic acid, and
(d) 3,4' and/or 4,4'-benzophenone dicarboxylic acid, wherein the polyesters contain the condensed radicals (a) in a quantity of from 40 to 80, preferably from 50 to 75, particularly from 60 to 70 mol %, the condensed radicals (c) in a quantity of from 15 to 58, preferably from 20 to 46, particularly from 20 to 35 mol %, and the condensed radicals (d) in a quantity of from 2 to 40, preferably from 4 to 30, particularly from 5 to 20 mol %, based, in each case, on the sum of the condensed radicals (a), (c) and (d), the molar ratio of the condensed radicals b/(c+d) being from 0.95 to 1.05 and the proportion of terephthalic acid radicals to the radicals (c) being at most 30 mol %.

Preferred (a) p-hydroxybenzoic acids are p-hydroxybenzoic acids substituted in the nucleus by $C_1$–$C_4$-alkyl, $C_1$–$C_4$-alkoxy, $C_6$–$C_{10}$-aryl, $C_7$–$C_{12}$-alkylaryl (such as phenyl, tolyl, naphthyl) or halogen (preferably chlorine), such as 4-hydroxy-2-methylbenzoic acid, 4-hydroxy-3-methyl-benzoic acid, 2-ethyl-4-hydroxybenzoic acid, 3-ethyl-4-hydroxybenzoic acid, 4-hydroxy-2-phenylbenzoic acid, 4-hydroxy-3-phenylbenzoic acid or 3-chloro-4-hydroxybenzoic acid, preferably, however, unsubstituted p-hydroxybenzoic acid.

The production of monomer units (d) has been known for a long time (see e.g.: Limpricht, A. 312 92, 96 or H. Staudinger, K. Clar, B. 44 1632 or L. Lavaux A. ch. (8) 21 144). 4,4'-Benzophenone dicarboxylic acid can be recovered in simple manner from the inexpensive crude materials toluene and phosgene. 4,4'-Dimethylbenzophenone is thereby obtained in a first stage from phosgene and toluene, and is then oxidised in a second stage to 4,4'-benzophenone dicarboxylic acid.

The polyesters according to the invention can contain the radicals of the compounds (a) to (d) in random distribution, in segments or in blocks. Regarding component (a), it is to be taken into account that relatively long blocks can substantially increase the melting point and the melt viscosity.

The polyesters according to the invention can contain as terminal groups, —COOH, —H, —OH, —OC$_6$H$_5$, acyloxy or radicals deriving from chain-terminators. Preferred chain-terminators are monofunctional aromatic hydroxyl compounds, such as 4-hydroxydiphenyl, p-nonylphenol, 4-(1,1,3,3-tetramethylbutyl)-phenol, β-naphthol, and aromatic monocarboxylic acids, such as diphenylcarboxylic acids and naphthalene carboxylic acids. Chain-terminators can be used in a quantity of from 0.5 to 5 mol %, based on the sum of the components (a) and (b).

Branching trifunctional or higher functional, preferably aromatic, monomers in a quantity of from 0.1 to 1 mol %, based on the sum of the components (a) and (b), such as phloroglucinol, 1,3,5-benzene tricarboxylic acid and 3,5-dihydroxybenzoic acid can also optionally be used.

The polyesters according to the invention generally have an inherent viscosity of at least 0.5, preferably at least 1.0 dl/g (determined using a solution of 5 mg of polyester/ml p-chlorophenol at 45° C.). Should the polyesters be insoluble in p-chlorophenol, it is assumed that they have the given minimum viscosity; they thus correspond to the invention, in case they fulfill the parameters of the main claim.

The polyesters according to the invention preferably have a melt viscosity of below 1000 Pa.s, measured at a shear rate of $10^3$ sec$^{-1}$ using a nozzle with a length/diameter ratio of 20 at a temperature of below 360° C., preferably below 330° C.

The polyesters according to the invention can be produced according to various processes, for example by condensation or transesterification of the reactive derivatives of the compounds (a) to (d), for example the esters or acid chlorides thereof, and by subsequent polycondensation.

Examples of preferred starting compounds are thus their aryl esters, their acyl esters and their acid chlorides.

According to a preferred synthesis process, the lower acyl esters, preferably the acetates, of the compounds (a) and (b) are reacted with isophthalic acid (c) and optionally terephthalic acid (c) as well as benzophenone dicarboxylic acid (d). The acyl esters may also be produced in situ.

These reactions can be carried out in the melt phase; however, the reaction in the presence of a liquid heat-conducting medium, which has a high boiling point, is also possible.

The radicals of the compounds (a) to (d) are incorporated in the polyesters in the ratio of the starting components used.

It can be useful to accelerate catalytically both the condensation- or transestrification reactions and the polycondensation reactions. Such catalysts are known, for example Lewis acids and hydrohalic acids; oxides, hydrides, hydroxides, halides, alcoholates, phenolates and salts of inorganic or organic acids (preferably carboxylic acid salts), complex salts or mixed salts of alkaline earth metals, such as magnesium or calcium; of transition metals, such as vanadium, titanium, manganese, cobalt, nickel, zinc, lanthanum, cerium, zirconium or the elements from other groups of the periodic system, such as germanium, tin, lead and antimony or also the alkali metals or alkaline earth metals themselves, particularly sodium, sodium hydroxide, lithium acetate, sodium acetate, potassium acetate, calcium acetate, magnesium acetate, cobalt acetate, zinc acetate, calcium benzoate, magnesium acetylacetonate, zinc acetylacetonate, vanadyl-$C_1$–$C_8$-alkoxides, titanium alkoxides such as titanium tetrabutylate or titanium tetrapropylate, alkoxytitanium silicates, zirconium butyrate, zirconium propylate, titanium tetraphenolate, sodium phenolate, germanium dioxide, antimony trioxide, dialkyl and diaryl tin oxide, di-butyl tin diacetate, and di-butyl dimethoxy tin. Magnesium, manganese, sodium, potassium and zinc acetate are particularly preferred.

The catalyst quantities ar preferably from 0.001 to 1, particularly from 0.01 to 0.2% by weight, based on the total weight of the monomers used.

The polyesters according to the invention can be produced at a temperature of from 160° to 370° C., the reaction generally being started at a low temperature and the temperature continuously being increased as the reaction progresses. As the reaction rate decreases, a vacuum can be applied, the pressure being preferably lowered continuously from normal pressure to about 0.1 mbar.

The product obtained, preferably in granular form, can be subjected to a solid phase post-condensation under reduced pressure at a temperature of from 200° to 300° C.; after from 5 to 25 h, the molecular weight has increased and the properties of the polyester resulting therefrom are noticeably improved.

The invention thus also provides a process for the production of the new polyesters by reacting the components (a) and (d) or the reactive derivatives thereof, which can also be prepared in situ, optionally in the presence of chain-terminators, branching agents and catalysts, at a temperature of from 160° to 370° C., optionally under reduced pressure.

The thermotropic polyesters according to the invention can be advantageously processed from the melt, owing to their relatively low melt viscosity, to produce injection mouldings, filaments, fibres, bands and films, a molecular orientation being achieved due to shearing forces, and which is influenced to a high degree by the intensity of the shear forces. Furthermore, they have a marked structural viscosity, that is, the melt viscosity falls substantially as the shear forces increase. Suitable processing methods are injection moulding, extrusion, pressing and melt spinning.

Mouldings can be produced from the polyesters according to the invention, which have a high tensile strength and great dimensional stability. As the polyesters are extraordinarily chemical-resistant and flame-resistant, they are preferably suitable for the production of electrotechnical articles, such as insulators, printed circuits, plug contacts, and parts of instrument panels,
parts of chemical-technical apparatus, such as pipes, container linings, rotors, slide bearings, packing,
parts for interior fittings for aircraft,
parts for medical-technical apparatus, such as components of air conditioning systems, valve parts.

The polyesters according to the invention can, however, also be used as covering and coating material in the form of powders or dispersions. They are also best suited for the production of reinforcing or filled moulding compositions with a reinforcing agent or filler content of from 5 to 65% by weight, based on the reinforced or filled moulding composition.

The invention thus also relates to the use of the new polyesters for the production of mouldings, filaments, fibres and films.

EXAMPLES

The testing of the impact strength $a_n$ and notched impact strength $a_k$ is carried out on standard small rods according to DIN 53 453 (ISO/R 179) at 23° C., in each case on 10 test samples. The determination of the flexural strength is carried out on standard small rods according to DIN 53 457 (ISO/R 178). The flexural modulus is determined according to DIN 53 457. The measurement of the dimensional stability under heat is carried out by determining the Vicat-B-softening temperature according to DIN 53 460 (ISO 306).

Comparison 1

The following substances are weighed into a one liter surface grinding container with surface grinding lid, stirrer, nitrogen inlet and a distillation attachment, which is connected to a cooler:

2.4 mol=331.49 g of p-hydroxybenzoic acid,
1.2 mol=199.36 g of terephthalic acid,
1.2 mol=202.34 g of 2,6-dihydroxynaphthalene,
5.76 mol=588.0 g of acetic anhydride,
0.5 g of magnesium acetate, and
0.5 g of antimony trioxide.

Heating to 170° C. is carried out in a nitrogen atmosphere by means of a salt bath. As soon as the distillation of acetic acid decreases (after about 35 minutes), the temperature in the reaction container is increased in the course of one further hour to 330° C. When distillation has ended, the pressure is lowered to about 1 mbar in the course of 30 min.

During this vacuum phase the viscosity of the resulting polymer melt substantially increases. The melt is thus stirred more slowly.

At the end of this phase, a total quantity of 670 g of acetic acid (containing remaining acetic anhydride) has been collected.

The grey-brown polyester obtained is ground and subjected to a solid phase post-condensation at 250° C. (with vacuum of about 1 mbar, 20 h).

The polyester produced in this manner is insoluble in p-chlorophenol. An optically antisotropic melt phase is observed in a range of from 290° to 400° C.

EXAMPLE 1

The following substances are added in the reaction apparatus described in Comparison 1:

2.4 mol=331.49 g of p-hydroxybenzoic acid,
1.44 mol=158.56 g of hydroquinone,
1.2 mol=199.36 g of isophthalic acid,
0.24 mol=64.8 g of 4,4'-benzophenone dicarboxylic acid,
6.3 mol=643.17 g of acetic anhydride,
0.5 g of magnesium acetate, and
0.5 g of germanium dioxide.

Heating to 170° C. is carried out in a nitrogen atmosphere by means of a salt bath. The reaction temperature is increased after 1 hr at 170° C. to 200° C. and in the course of 4 more hours to 320° C. When the distillation has ended, the pressure is decreased to 2.5 mbar in the course of about 20 min. During the vacuum phase, the product remains easily stirrable. At the end of this phase, a total quantity of 730 g of acetic acid (containing remaining acetic anhydride) has been collected.

The light beige product obtained is ground and subjected to a solid phase post-condensation at 250° C. (about 1 mbar/24 h). The inherent viscosity of the polyester treated in this manner is 1.20 dl/g. An optically anisotropic melt phase is observed in a range of from 310° C. to 400° C.

EXAMPLES 2 TO 5

Further polesters are produced in the reaction apparatus described in Example 1 and according to the process there described. The types and quantities of the starting materials are listed in Table 1.

TABLE 1

| Example | (a) (mol) | (b) (mol) | | (c) (mol) | | (d) (mol) | | acetic anhydride (mol) | η inh (dl/g) | anisotropic melt |
|---|---|---|---|---|---|---|---|---|---|---|
| 2 | 2.6 | 1.4 | Hy | 1.2 | IS | 0.2 | 4,4'-DCB | 6.4 | 1.96 | 290–400° C. |
| 3 | 1.685 | 1.56 | Hy | 1.39 | IS | 0.17 | 4,4'-DCB | 5.7 | 1.05 | 260–400° C. |
| 4 | 2.6 | 1.8 | Hy | 1.1 IS 0.3 TS | | 0.4 | 4,4'-DCB | 7.4 | 2.46 | 320–400° C. |
| 5 | 2.4 | 1.44 | DOD | 1.2 | IS | 0.24 | 4,4'-DCB | 6.3 | 1.84 | 300–400° C. |
| 6 | 2.4 | 1.44 | Hy | 1.2 | IS | 0.24 | 3,4'-DCB | 6.3 | 2.31 | 310–400° C. |

Abbreviations:
Hy = hydroquinone;
DOD = 4,4'-dihydroxydiphenyl;
IS = isophthalic acid
TS = terephthalic acid
DCB = benzophenone dicarboxylic acid Standard small rods are produced by injection moulding from the polyesters in Comparison 1 and in Examples 1 to 6 for testing the mechanical properties. The measured values are listed in Table 2.

TABLE 2

| Example | Vicat B (°C.) | $a_n/a_k$ (kJ/m$^2$) | flexural strength (MPa) | flexural modulus (MPA) | processing temperature (°C.) |
|---|---|---|---|---|---|
| Comparison 1 | 162 | 13/10 | 157 | 10448 | 330 |
| 1 | 141 | 12/8 | 163 | 10270 | 340 |
| 2 | 145 | 6/1.5 | 144 | 8790 | 330 |
| 3 | 146 | 27$^x$/22$^x$ | 153 | 9133 | 340 |
| 4 | 144 | 15$^{xx}$/8 | 154 | 10400 | 330 |
| 5 | 151 | 18$^{xx}$/10 | 149 | 10120 | 340 |
| 6 | 158 | 12/9 | 164 | 10820 | 330 |

$^x$ = partly broken
$^{xx}$ = some partly broken

We claim:

1. A thermotropic aromatic polyester containing condensed radicals of
   (a) p-hydroxybenzoic acid or substituted p-hydroxybenzoic acid substituted by alkyl having 1 to 4 carbon atoms, alkoxy having 1 to 4 carbon atoms, aryl having 6 to 10 carbon atoms, alkylaryl having 7 to 12 carbon atoms, or halogen,
   (b) hydroquinone, 4,4'-dihydroxydiphenyl or a mixture thereof,
   (c) isophthalic acid and optionally terephthalic acid, and
   (d) 3,4'-benzophenone dicarboxylic, 4,4'-benzophenone dicarboxylic acid or a mixture thereof,
wherein the polyester contains the condensed radicals
   (a) in a quantity of from 40 to 80 mol%,
   (c) in a quantity of from 15 to 58 mol%, and
   (d) in a quantity of from 2 to 40 mol %,
based, in each case, on the sum of the condensed radicals (a), (c) and (d), the molar ratio of the condensed radicals (b)/(c+d) being from 0.95 to 1.05 and the proportion of terephthalic acid radicals to the radicals (c) being at most 30 mol %.

2. A polyester according to claim 1, characterised in that it contains the condensed radicals
   (a) in a quantity of from 50 to 75 mol %, the condensed radicals
   (c) in a quantity of from 20 to 46 mol% and the condensed radicals
   (d) in a quantity of from 4 to 30 mol %,
based, in each case, on the sum of the condensed radicals (a), (c) and (d).

3. A polyester according to claim 2, characterised in that it contains the condensed radicals
   (a) in a quantity of from 60 to 70 mol %, the condensed radicals
   (c) in a quantity of from 20 to 35 mol %, and the condensed radicals
   (d) in a quantity of from 5 to 20 mol %,
based, in each case, on the sum of the condensed radicals (a), (c) and (d).

4. An article of manufacture of the polyester of claim 1 in the form of a moulding, filament, fiber or film.

* * * * *